United States Patent
Kirihara (10) Patent No.: US 9,094,552 B2
(45) Date of Patent: Jul. 28, 2015

(54) SCREEN CONTROL DEVICE, IMAGE FORMING APPARATUS, AND COMPUTER READABLE MEDIUM

(75) Inventor: Kazuko Kirihara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 683 days.

(21) Appl. No.: 13/025,851

(22) Filed: Feb. 11, 2011

(65) Prior Publication Data

US 2012/0062937 A1    Mar. 15, 2012

(30) Foreign Application Priority Data

Sep. 14, 2010 (JP) .................. 2010-205009

(51) Int. Cl.
   *G06F 3/12* (2006.01)
   *H04N 1/00* (2006.01)

(52) U.S. Cl.
   CPC .................. *H04N 1/00517* (2013.01)

(58) Field of Classification Search
   USPC ....................................... 358/1.15
   See application file for complete search history.

(56) References Cited

U.S. PATENT DOCUMENTS

| 2007/0109580 A1* | 5/2007 | Yoshida ........................ 358/1.13 |
| 2009/0138802 A1 | 5/2009 | Yamashita |
| 2010/0290071 A1* | 11/2010 | Okada et al. ................. 358/1.13 |

FOREIGN PATENT DOCUMENTS

| CN | 1967541 A | 5/2007 |
| CN | 101288044 A | 10/2008 |
| EP | 0 982 911 A2 | 3/2000 |
| JP | 08-153004 A | 6/1996 |
| JP | 09-114625 A | 5/1997 |
| JP | 2000-66789 A | 3/2000 |
| JP | 2006-202320 A | 8/2006 |
| JP | 2007-109114 A | 4/2007 |
| JP | 2007-200104 A | 8/2007 |
| JP | 2007-279894 A | 10/2007 |
| JP | 2009-077335 A | 4/2009 |

OTHER PUBLICATIONS

Chinese Office Action dated Jul. 2, 2014, issued in corresponding Chinese Patent Application No. 201110063262.9.
Japanese Office Action dated May 7, 2014 issued in corresponding Japanese Application No. 2010-205009.

* cited by examiner

*Primary Examiner* — Ashish K Thomas
*Assistant Examiner* — Neil R McLean
(74) *Attorney, Agent, or Firm* — Sughrue Mion, PLLC (57) ABSTRACT

A screen control device includes: a storage unit storing a content of a function used in a process executed in a information processing apparatus in association with setting information set to a setting item of the function; a function selection unit configured to calculate a usage frequency of each function stored in the storage unit, and select at least one function based on the usage frequency; a setting item determination unit configured to determine a setting item for receiving an input from a user from setting items relating to a function selected by the function selection unit based on setting information stored in the storage unit; a display controller configured to display a screen enabling to receive an instruction to execute the function selected by the function selection unit and a screen receiving an input to a setting item determined by the setting item determination unit from a user.

8 Claims, 11 Drawing Sheets

| No. | FUNCTION | USER ID | SETTING INFORMATION |
|---|---|---|---|
| 1 | COPY | A001 | COLOR MODE:MONOCROME ORIGINAL DOCUMENT:DUPLEX Nup:2Up ... |
| 2 | SCAN | C001 | COLOR MODE:MONOCROME RESOLUTION:600 dpi ... |
| 3 | COPY | A001 | COLOR MODE:FULL COLOR ORIGINAL DOCUMENT:DUPLEX Nup:2Up ... |
| 4 | FAX | B001 | COLOR MODE:MONOCROME DESTINATION:XX-XXXX-XXXX |
| 5 | COPY | B002 | COLOR MODE:MONOCROME ORIGINAL DOCUMENT:DUPLEX Nup:2Up ... |
| 6 | SCAN TRANSFER | A001 | COLOR MODE:MONOCROME RESOLUTION:600 dpi TRANSFER SYSTEM:SMB DESTINATION:XXX.YY.X.X.X |
| 7 | COPY | A001 | COLOR MODE:MONOCROME ORIGINAL DOCUMENT:DUPLEX Nup:1Up |
| ... | ... | ... | ... |

| No. | FUNCTION | USER ID | SETTING INFORMATION |
|---|---|---|---|
| 1 | COPY | A001 | COLOR MODE":MONOCROME ORIGINAL DOCUMENT:DUPLEX Nup:2Up··· |
| 3 | COPY | A001 | COLOR MODE:FULL COLOR ORIGINAL DOCUMENT:DUPLEX Nup:2Up ··· |
| 6 | SCAN TRANSFER | A001 | COLOR MODE:MONOCROME RESOLUTION:600 dpi TRANSFER SYSTEM:SMB DESTINATION:XXX.YY.X.X.X |
| 7 | COPY | A001 | COLOR MODE:MONOCROME ORIGINAL DOCUMENT:DUPLEX Nup:1Up |
| ... | ... | ... | ... |

FIG. 6B

| COPY | SCAN | FAX | SCAN TRANSFER | ... | TOTAL |
|---|---|---|---|---|---|
| 10 | 0 | 1 | 1 | ... | 15 |

FIG. 7

USER ID:A001 , FUNCTION:COPY

| No. | COLOR MODE | ORIGINAL DOCUMENT | Nup | SIZE | DENSITY | NUMBER OF COPIES | ... |
|---|---|---|---|---|---|---|---|
| 1 | MONO-CHROME | DUPLEX | 2UP | A4 | MEDIUM | 1 | ... |
| 3 | FULL COLOR | DUPLEX | 2UP | A4 | MEDIUM | 2 | ... |
| 7 | MONO-CHROME | DUPLEX | 1UP | A4 | MEDIUM | 1 | ... |
| 9 | MONO-CHROME | DUPLEX | 2UP | A4 | MEDIUM | 2 | ... |
| 10 | FULL COLOR | DUPLEX | 1UP | A4 | MEDIUM | 12 | ... |
| 11 | MONO-CHROME | DUPLEX | 2UP | A4 | MEDIUM | 3 | ... |
| ⋮ | ⋮ | ⋮ | ⋮ | ⋮ | ⋮ | ⋮ | ⋮ |

⎵ NOT CHANGED (ORIGINAL DOCUMENT, Nup)    ⎵ NOT CHANGED (SIZE, DENSITY)

| No. | FUNCTION | USER ID | SETTING INFORMATION |
|---|---|---|---|
| 1 | SCAN | C001 | COLOR MODE:FULL COLOR RESOLUTION:600 dpi STORAGE LOCATION: INSIDE OF IMAGE INFORMING APPARATUS SAVED FILE NAME:CCCC.bmp |
| 2 | SCANNED IMAGE RETRIEVAL | C001 | SOURCE:XXX.XX.X.X.C ACQUIRED FILE NAME:CCCC.bmp |
| 3 | COPY | A001 | COLOR MODE:FULL COLOR ORIGINAL DOCUMENT:DUPLEX Nup:2Up |
| 4 | FAX | B001 | COLOR MODE:MONOCROME DESTINATION:xx-xxxx-xxxx |
| 5 | SCAN | C001 | COLOR MODE:MONOCROME RESOLUTION:300 dpi STORAGE LOCATION INSIDE OF IMAGE INFORMING APPARATUS SAVED FILE NAME:DDDD.bmp |
| 6 | COPY | A001 | COLOR MODE:FULL COLOR ORIGINAL DOCUMENT:DUPLEX Nup:2UP |
| 7 | SCANNED IMAGE RETRIEVAL | C001 | SOURCE:XXX.XX.X.X.C ACQUIRED FILE NAME:DDDD.bmp |
| ... | ... | ... | ... |

FIG. 10A

| MODE | USER ID | PARAMETER |
|---|---|---|
| SCAN TRANSFER | C001 | COLOR MODE:FULL COLOR RESOLUTION:600 dpi TRANSFER SYSTEM: SMB DESTINATION:XXX.YY.X.X.C |
| SCAN TRANSFER | C001 | COLOR MODE:MONOCHROME RESOLUTION:300 dpi TRANSFER SYSTEM: SMB DESTINATION:XXX.YY.X.X.C |
| ... | ... | ... |

FIG. 10B

| COPY | SCAN | FAX | SCAN TRANSFER | ... | TOTAL |
|---|---|---|---|---|---|
| 0 | 0 | 1 | 10 | ... | 11 |

FIG. 11

SCREEN CONTROL DEVICE, IMAGE FORMING APPARATUS, AND COMPUTER READABLE MEDIUM

CROSS-REFERENCE TO RELATED APPLICATION

This application is based on and claims priority under 35 USC 119 from Japanese Patent Application No. 2010-205009 filed on Sep. 14, 2010.

BACKGROUND (i) Technical Field

The present invention relates to a screen control device, an image forming apparatus, and a computer readable medium.

(ii) Related Art

Recently, as multiple functions are incorporated in an image forming apparatus, a number of buttons to receive various settings are located on an operation screen that receives instructions to the image forming apparatus from the user. This makes the operation to the image forming apparatus, which a user carries out to execute a desired process, complicated and cumbersome.

SUMMARY

According to an aspect of the present invention, there is provided a screen control device including: a storage unit that stores a content of a function used in a process executed in an information processing apparatus in association with setting information set to a setting item of the function; a function selection unit configured to calculate a usage frequency of each function stored in the storage unit, and select at least one function based on the usage frequency; a setting item determination unit configured to determine a setting item for receiving an input from a user from setting items relating to a function selected by the function selection unit, based on the setting information stored in the storage unit; a display controller configured to display a screen that enables to receive an instruction to execute the function selected by the function selection unit and a screen that receives an input to a setting item determined by the setting item determination unit from a user.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

First Exemplary Embodiment

Figure 1:
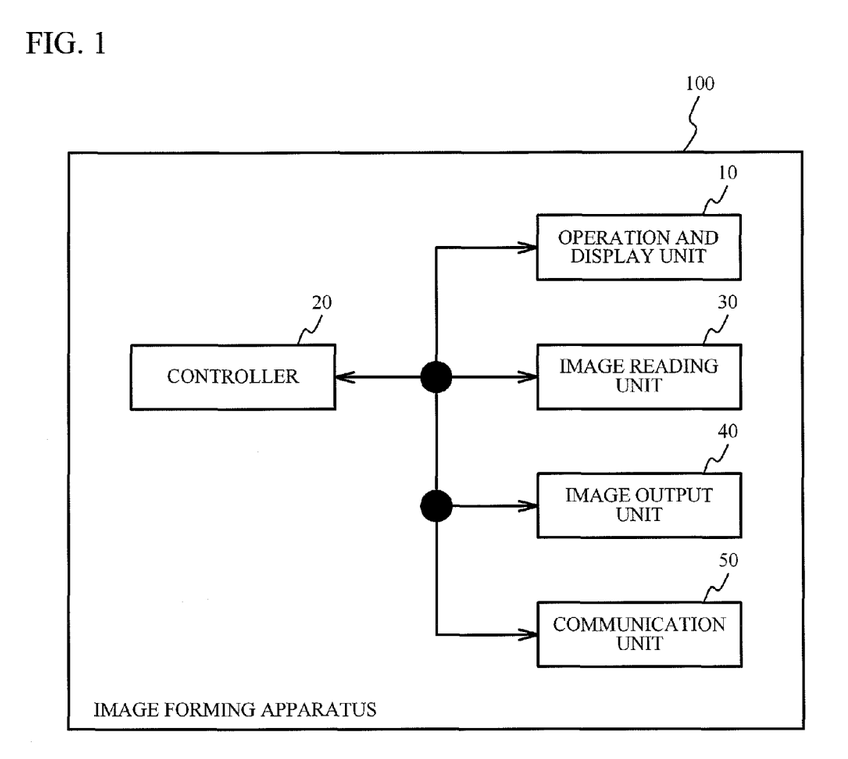
FIG. 1 is a diagram illustrating a composition of an image forming apparatus to which the present invention is applied.

FIG. 1 is a diagram illustrating a composition of an image forming apparatus to which the present invention is applied. An image forming apparatus 100 is provided with an operation and display unit 10, a controller 20, an image reading unit 30, an image output unit 40 and a communication unit 50. The image forming apparatus 100 is an example of an information processing apparatus, the operation and display unit 10 is an example of a display, and the controller 20 is an example of a screen control device.

The operation and display unit 10 displays an operation screen to receive an operational input to the image forming apparatus from a user based on the control by the controller 20. The operation and display unit 10 receives instructions to the image forming apparatus 100 from a user through the operation screen. The operation and display unit 10 outputs instruction information representing instructions to the image forming apparatus 100 received from the user through the operation screen to the controller 20.

The controller 20 controls whole operation of the image forming apparatus 100. More specifically, the controller 20 controls the operation and display unit 10 to display the operation screen on the operation and display unit 10. In addition, the controller 20 receives instruction information to the image forming apparatus from the operation and display unit 10.

The controller 20 also controls the image reading unit 30, the image output unit 40 and the communication unit 50, which are provided to the image forming apparatus 100, according to received instruction information. For example, when the instruction information to order the scan of an image is received from the operation and display unit 10, the controller 20 controls the image reading unit 30 to scan an original document located on a platen and acquire an image of the original document. Moreover, when instruction information to order a copy is received from the operation and display unit 10, the controller 20 controls the image reading unit 30 to scan an original document located on a platen, and acquire the image of the original document. Then, the controller 20 controls the image output unit 40 to form the acquired image of the original document on a recording medium such as paper and output it.

When instruction information to order a scan-transfer is received from the operation and display unit 10, the controller 20 controls the image reading unit 30 to scan an original document located on a platen and acquire an image of the original document. Then, the controller 20 controls the communication unit 50 to transmit the acquired image of the original document to an information processing apparatus (not illustrated). When instruction information to order the FAX transmission is received from the operation and display unit 10, the controller 20 controls the image reading unit 30 to scan the document to be transmitted located on a platen and acquire the document image. Then, the controller 20 controls the communication unit 50 to transmit the acquired document image to the destination specified through the operation and display unit 10.

The image reading unit 30 is a scanner for example, and reads an original document located on a platen according to the control by the controller 20, and outputs the read image of the original document to the controller 20.

The image output unit 40 forms the image on a recording medium such as paper and outputs it according to the control by the controller 20.

The communication unit 50 transmits the document image to be transmitted to the destination specified through the operation and display unit 10 according to the control by the controller 20.

Figure 2:
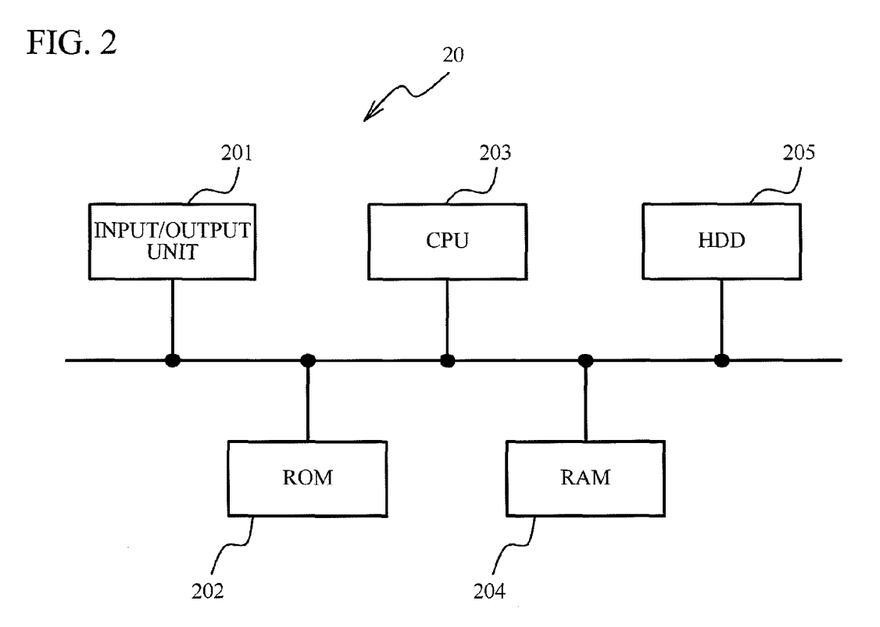
FIG. 2 is a diagram illustrating a hardware structure of a controller.

A description will now be given of a hardware structure of the controller 20. FIG. 2 is a diagram illustrating a hardware structure of the controller 20.

The controller 20 is provided with an input/output unit 201, a ROM (Read Only Memory) 202, a CPU (Central Processing Unit) 203, a RAM (Random Access Memory) 204, and an HDD (Hard Disk Drive) 205.

The input/output unit 201 transmits/receives data to/from the operation and display unit 10, the image reading unit 30, the image output unit 40, and the communication unit 50. The ROM 202 stores programs for creating an optimized screen which is an operation screen optimized for each user. The CPU 203 reads and executes programs stored in the ROM 202. The RAM 204 stores temporary data used during the execution of programs. The HDD 205 stores the image of the original document read by the image reading unit 30. The HDD 205 stores the history information of processes executed by the image forming apparatus 100 and the like.

Figure 3:
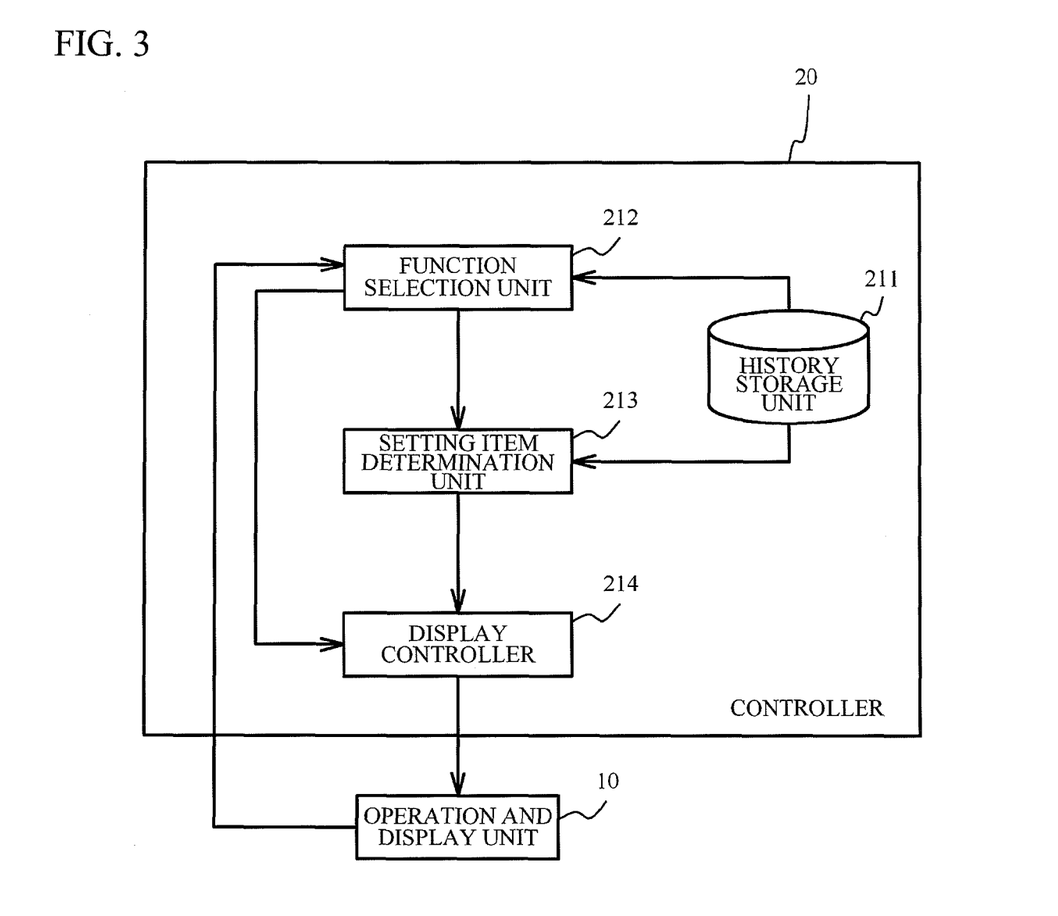
FIG. 3 is a functional block diagram illustrating functions provided to the controller.

A description will now be given of functions provided to the controller 20. FIG. 3 is a functional block diagram illustrating functions provided to the controller 20. The controller 20 is provided with a history storage unit 211, a function selection unit 212, a setting item determination unit 213, and a display controller 214. The history storage unit 211 is the HDD 205 for example. Moreover, the function selection unit 212, the setting item determination unit 213, and the display controller 214 are achieved by the execution of programs stored in the ROM 202 by the CPU 203.

The history storage unit 211 is an example of an storage unit. The history storage unit 211 associates a content of a function which is used in the process executed in the image forming apparatus 100 with setting information representing the setting of setting items of the function, and stores them. More specifically, the history storage unit 211 stores history information of processes executed by the image forming apparatus 100. Here, a description will be given of an example of the history information stored in the history storage unit 211 with reference to FIG. 4.

Figure 4:
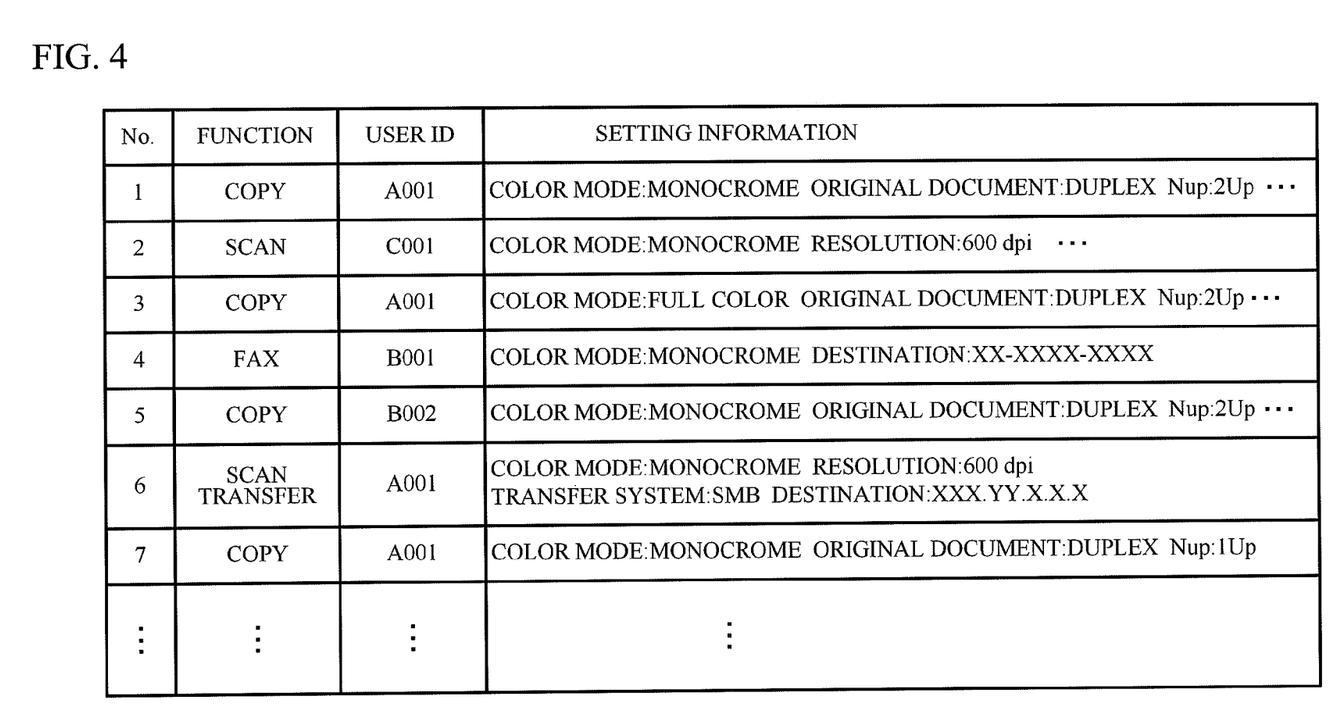
FIG. 4 is a diagram illustrating history information stored in a history storage unit.

FIG. 4 is a diagram illustrating history information stored in the history storage unit 211. In this exemplary embodiment, the history information includes "No.", "function", "user ID" and "setting information" as items.

The item "No." stores numbers which are automatically put to processes executed by the image forming apparatus 100. The item "function" stores a function of the image forming apparatus 100 used in the executed process. The item "user ID" stores the number to identify the user who executed the process identified by the "No.", and is an example of user information.

The item "setting information" stores the setting information such as printing conditions and operation conditions set to the image forming apparatus 100 when the process identified by the "No." was executed. Information stored in the "setting information" depends on the "function". For example, when 'copy' is stored in the "function", setting information in the execution of copy is stored in the "setting information". More specifically, setting information including a "color mode" setting, an "original document" setting, an "Nup" setting and the like is stored. The "color mode" setting is a setting for selecting color copy or monochrome copy. The "original document" setting is a setting for selecting one-side printing or duplex printing. Here, one-side printing means printing an image on one surface of a sheet, and duplex printing means printing images on both faces of a sheet. The "Nup" setting is a setting for printing multiple pages (N pages) on a single sheet together.

When 'scan' is stored in the "function", setting information in the execution of scan is stored in the "setting information". More specifically, the setting information including a "color mode" setting, a "resolution" setting and the like is stored. The "color mode" setting is a setting for selecting color scan of the original document or monochrome scan of the original document. The "resolution" setting is a setting for determining the resolution of scan of the original document.

When 'scan-transfer' is stored in "function", the setting information in the execution of scan-transfer is stored. More specifically, the setting information including "color mode" setting, "resolution" setting and the like is stored. The "color mode" setting is a setting for selecting color scan of the original document or monochrome scan of the original document. The "resolution" setting is a setting for determining the resolution of scan of the original document. Moreover, a "transfer system" and a "destination" are also stored as the setting information. Here, the "transfer system" indicates the system to transfer the read original document to an information processing apparatus, and the "destination" is for identifying the image processing apparatus of the destination.

In FIG. 4, the process identified by No. 1 is executed by a user with a user ID of 'A001', and uses a copy function. Moreover, a copy executed in the process No. 1 is monochrome duplex copy, and prints two pages on one surface of a sheet.

The process No. 2 is executed by a user with a user ID of 'C001', and uses a scan function. In the process No. 2, the original document is read in monochrome with a resolution of 600 dpi.

The process No. 6 is executed by a user with a user ID of 'A001', and uses a scan-transfer function. When executing a scan-transfer, the original document is read in monochrome with a resolution of 600 dpi, and the read original document is transmitted to an information processing apparatus represented by IP address "XXX.YY.X.X.X" with SMB (Server Message Block) transfer protocol.

Back to FIG. 3, a description will be continued. The function selection unit 212 receives an instruction to create the optimized screen, which is an operation screen optimized to improve the user-friendliness for each user, from the operation and display unit 10. When the function selection unit 212 receives the instruction to create an optimized screen from the operation and display unit 10, it acquires the history information from the history storage unit 211. The function selection unit 212 calculates the usage frequency of each function based on the history information illustrated in FIG. 4. The function selection unit 212 selects at least one function from functions provided to the image forming apparatus 100 as a function to be displayed on an optimized screen on the basis of the usage frequency. The function selection unit 212 outputs the selected function to the setting item determination unit 213 and the display controller 214. The process executed by the function selection unit 212 will be described in detail later.

The setting item determination unit 213 receives the function selected by the function selection unit 212 from the function selection unit 212. The setting item determination unit 213 acquires the history information from the history storage unit 211. Then, the setting item determination unit 213 refers to the history information, and acquires the setting information set in the process that used the selected function. The setting item determination unit 213 determines a setting item for receiving the input from the user on the basis of the acquired setting information. The setting item determination unit 213 outputs the determined setting item to the display controller 214. The process executed by the setting item determination unit 213 will be described in detail later.

The display controller 214 acquires the function, which is selected by the function selection unit 212 and is to be displayed on the optimized screen, from the function selection unit 212. In addition, the display controller 214 receives the setting item for receiving the input from the user from the setting item determination unit 213. The display controller 214 creates the optimized screen on which a function selection key corresponding to the function selected by the function selection unit 212 is displayed. In addition, the display controller 214 creates the optimized screen on which the setting item determined by the setting item determination unit 213 is displayed. Then, the display controller 214 displays the created optimized screen on the operation and display unit 10. Examples of the optimized screen will be described later.

Figure 5:
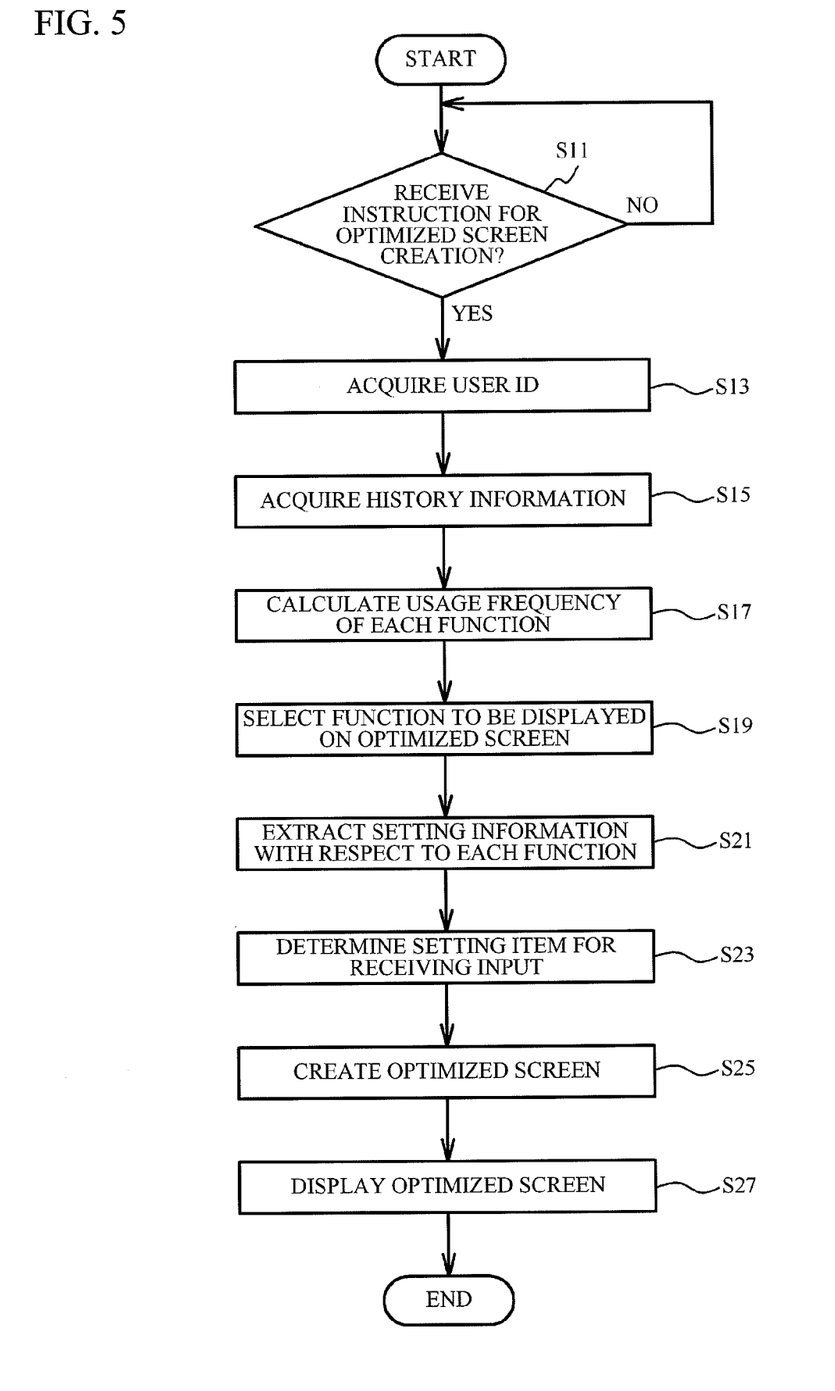
FIG. 5 is a flowchart illustrating a process executed by the controller.

A description will now be given of a process executed by the controller 20. FIG. 5 is a flowchart illustrating a process executed by the controller 20.

The function selection unit 212 determines whether it receives an instruction to create an optimized screen from the operation and display unit 10 (step S11).

When the instruction to create an optimized screen is not received (step S11/NO), the function selection unit 212 repeats the procedure of the step S11. When the function selection unit 212 receives the instruction to create the optimized screen from the operation and display unit 10 (step S11/YES), it acquires a user ID of the user who input the instruction to create an optimized screen from the operation and display unit 10 (step S13).

Figure 6A:
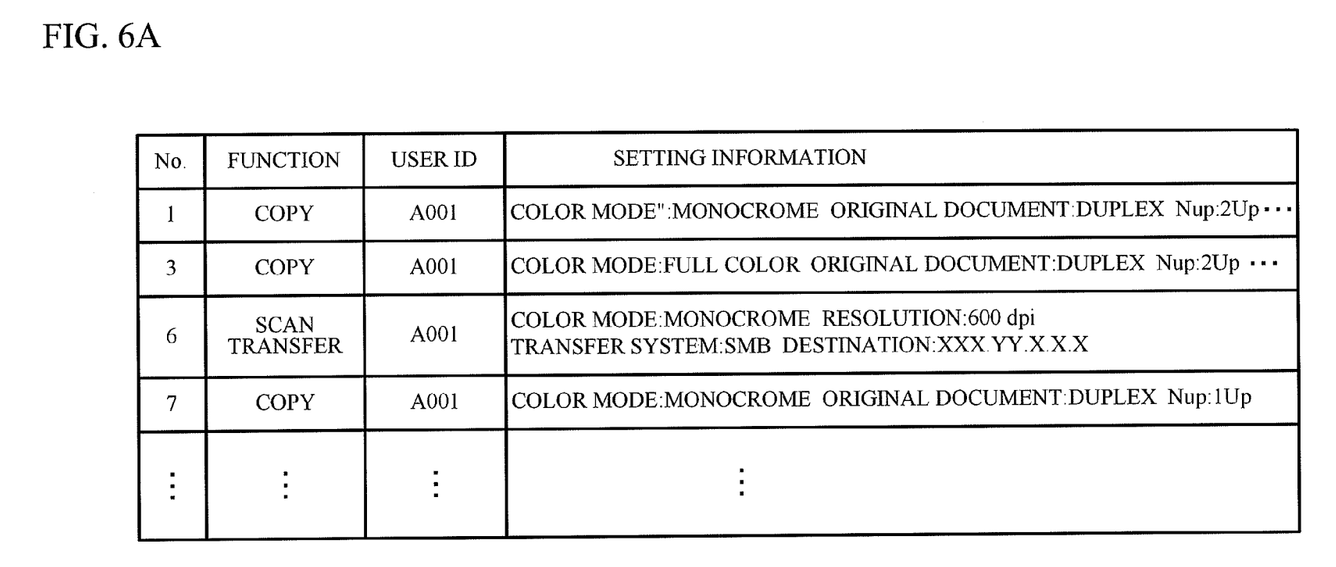
FIGS. 6A and 6B are diagrams for explaining the calculation of a usage frequency of each function executed by a function selection unit.
Figure 6B:
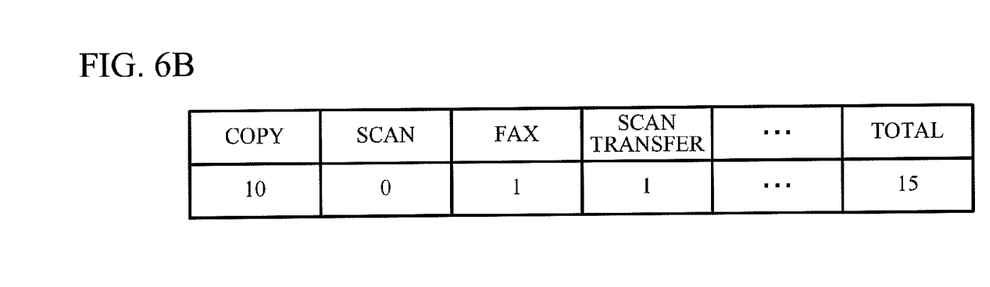

Then, the function selection unit 212 acquires the history information from the history storage unit 211 (step S15). The function selection unit 212 calculates the usage frequency of each function provided to the image forming apparatus 100 based on the history information (step S17). More specifically, the function selection unit 212 extracts records of which the "user ID" corresponds to the user ID of the user who input the instruction to create the optimized screen from the history information. For example, assume that the user ID of the user who input the instruction to create the optimized screen is 'A001'. In this case, the function selection unit 212 extracts records of which the user ID is 'A001' from the history information. For example, the function selection unit 212 extracts records of which the user ID is 'A001' from the history information in FIG. 4 as illustrated in FIG. 6A. Then, the function selection unit 212 counts the number of usage times with respect to each function with extracted records as illustrated in FIG. 6B.

The function selection unit 212 selects the function to be displayed on the optimized screen on the basis of the usage frequency of each function calculated in the step S17 (step S19). More specifically, the function selection unit 212 selects a function of which the number of usage times is more than a given value as a function to be displayed on the optimized screen. Alternatively, when the value calculated by dividing the number of usage times of a function by the number of extracted records (total number) is more than a given threshold value (e.g. 0.5), the function selection unit 212 selects the function as the function to be displayed on the optimized screen. In FIG. 6B, the value calculated by dividing the number of usage times of copy function (10 times) by the number of extracted records (15 times) is about 0.67. When a given threshold value is 0.5, as the value calculated by dividing the number of usage times of copy function by the number of extracted records is more than the threshold value, the function selection unit 212 selects the copy function as the function to be displayed on the optimized screen. As the values calculated by dividing the numbers of usage times of scan, FAX and scan-transfer by the number of extracted records are smaller than the threshold value, the function selection unit 212 does not select these functions as the function to be displayed on the optimized screen.

Then, the setting item determination unit 213 extracts setting information with respect to each function selected in the step S19 (step S21). For example, when the user ID of the user who input the instruction to create the optimized screen is 'A001' and the function selected in the step S19 is 'copy', the setting item determination unit 213 extracts records of which the user ID is 'A001' and the function is 'copy'. The setting item determination unit 213 may extract setting information of records of which the "function" is 'copy' from records represented in FIG. 6A.

Figure 7:
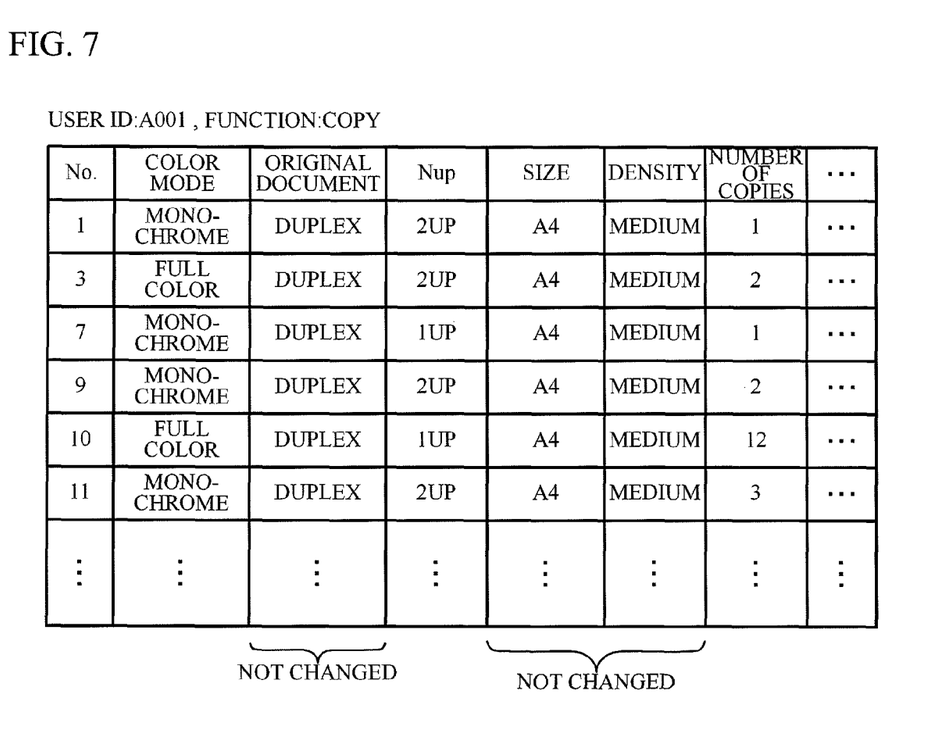
FIG. 7 is a diagram for explaining the determination of setting items executed by a setting item determination unit.

Examples of extracted setting information are illustrated in FIG. 7. FIG. 7 illustrates examples of setting information extracted in a case where the user ID of the user who input the instruction to create the optimized screen is 'A001' and the function selected in the step S19 is 'copy'.

Then, the setting item determination unit 213 determines a setting item for receiving the input from the user on the basis of the extracted setting information (step S23). More specifically, the setting item determination unit 213 determines whether each setting item is changed in each process. For example, in FIG. 7, settings for the setting items "color mode", "number of copies" and "Nup" are changed, but the settings of "original document", "size" and "density" are not changed. Here, the "size" represents the size of a sheet where the image is formed, and the "density" is the setting for the copy density. In this case, the setting item determination unit 213 determines that it is necessary to receive inputs to the setting items "color mode", "number of copies" and "Nup" from the user. Then, the setting item determination unit 213 determines setting items "color mode", "number of copies" and "Nup" as the setting items for receiving the input from the user. The setting item determination unit 213 may determine the setting items for receiving the input from the user on the basis of the frequency of changing each setting items. For example, when the frequency of changing "color mode" is more than a threshold value, the setting item determination unit 213 may determine the "color mode" as the setting item for receiving the input from the user. Alternatively, when the value calculated by dividing the number of times of changing the setting of "color mode" by the number of extracted records is more than a threshold value, the setting item determination unit 213 may determine the "color mode" as the setting item for receiving the input from the user.

Figure 8A:
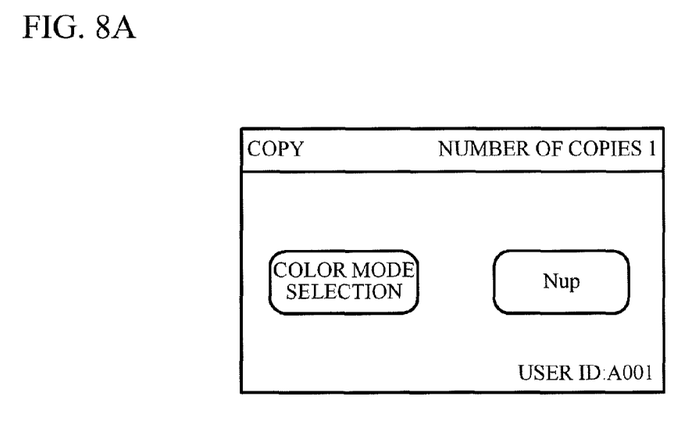
FIGS. 8A through 8D are diagrams illustrating optimized screens created by a display controller.

The display controller 214 creates an optimized screen based on the function and the setting item determined in the step S19 and the step S23 respectively (step S25). For example, assume that the function determined in the step S19 is 'copy' and setting items determined in the step S23 are "color mode" and "Nup". In this case, the display controller 214 creates a screen for receiving inputs to the setting items "color mode" and "Nup" from the user and executing a copy function as the optimized screen for the user with a user ID of 'A001', as illustrated in FIG. 8A.

Figure 8B:
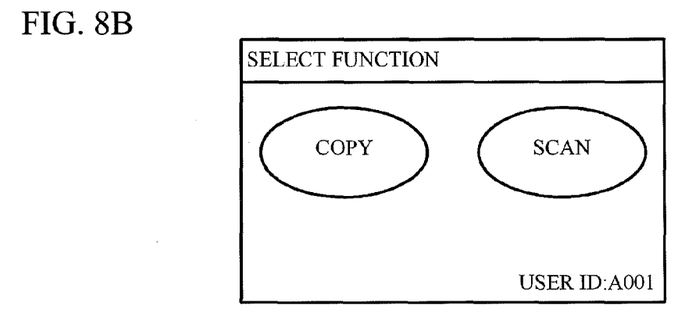
Figure 8C:
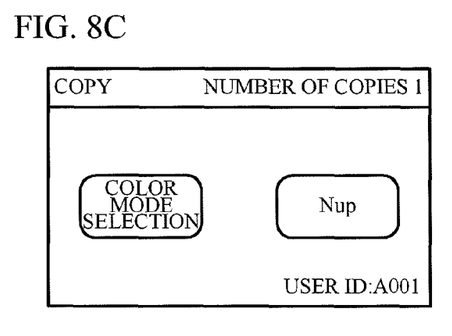
Figure 8D:
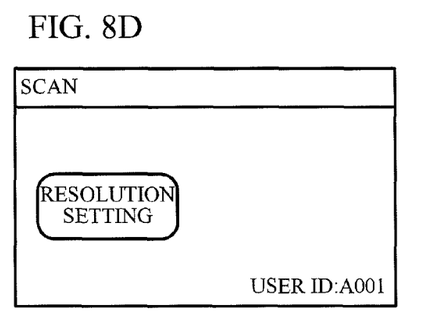

For example, assume that functions determined in the step S19 are 'copy' and 'scan', setting items for a 'copy' function determined in the step S23 are the "color mode" and the "Nup", and a setting item for a 'scan' function is the "resolution". In this case, the display controller 214 creates a screen for executing 'copy' and 'scan' functions as the optimized screen, as illustrated in FIG. 8B. In addition, when a 'copy' function is selected in the screen illustrated in FIG. 8B, the display controller 214 creates a screen for receiving inputs to the setting items "color mode" and "Nup" as an optimized screen as illustrated in FIG. 8C. Furthermore, when a 'scan' function is selected in the screen illustrated in FIG. 8B, the display controller 214 creates a screen for receiving the input to the setting item "resolution" as the optimized screen as illustrated in FIG. 8D.

The display controller 214 displays the screen created in the step S25 (optimized screen) on the operation and display unit 10 as an operation screen (step S27), and ends the process.

As clear from above description, in the first exemplary embodiment, the history storage unit 211 stores a function of the image forming apparatus used in a process executed in the image forming apparatus in association with the setting information set in the process and the information of the user who executed the process. The function selection unit 212 calculates the usage frequency of each function based on the history information and selects at least one function as a function to be displayed on an operation screen based on the frequency of usage. The setting item determination unit 213 determines a setting item for receiving the input from the user based on the setting information set in the process that used the function selected by the function selection unit 212. Then, the display controller 214 displays a screen for executing the function selected by the function selection unit 212, and a screen for receiving the input to the setting item determined by the setting item determination unit 213 from the user on the operation and display unit 10. In the image forming apparatus that offers multiple functions, there is a case where it is difficult to know what operation is necessary to execute user's desiring process from many possible operations. Although an image forming apparatus that enables a user to customize an operation screen manually has been provided, the user needs to be familiar with the operation of the image forming apparatus to set the operation screen for executing user's desiring process from many functions. However, according to the first exemplary embodiment, as a function that the user frequently uses and the setting items which are frequently changed in the function are displayed on the operation screen, the user-friendliness when inputting the instruction to the image forming apparatus is improved. In addition, according to the first exemplary embodiment, the operation screen of which the user-friendliness for the user is high is automatically provided based on the history information. Therefore, it is not necessary for the user to customize the operation screen manually, and the user convenience in customizing the operation screen is increased.

Second Exemplary Embodiment

A description will now be given of a second exemplary embodiment. As the composition of the image forming apparatus and the composition of the controller in accordance with the second exemplary embodiment are same as those of the first exemplary embodiment, the description is omitted. As the second exemplary embodiment is different from the first exemplary embodiment in the process executed by the function selection unit 212, a description will be given of a process executed by the function selection unit 212 in detail.

In the first exemplary embodiment, the function selection unit 212 counts the number of usage times of each function by using the history information extracted on the basis of the user ID. In the second exemplary embodiment, when the combination of several processes included in the history information can be achieved by one function provided by the image forming apparatus 100, the function selection unit 212 replaces functions, which are used in the several processes that may be achieved by one function, with the one function, and counts the number of usage times of the one function.

Figure 9:
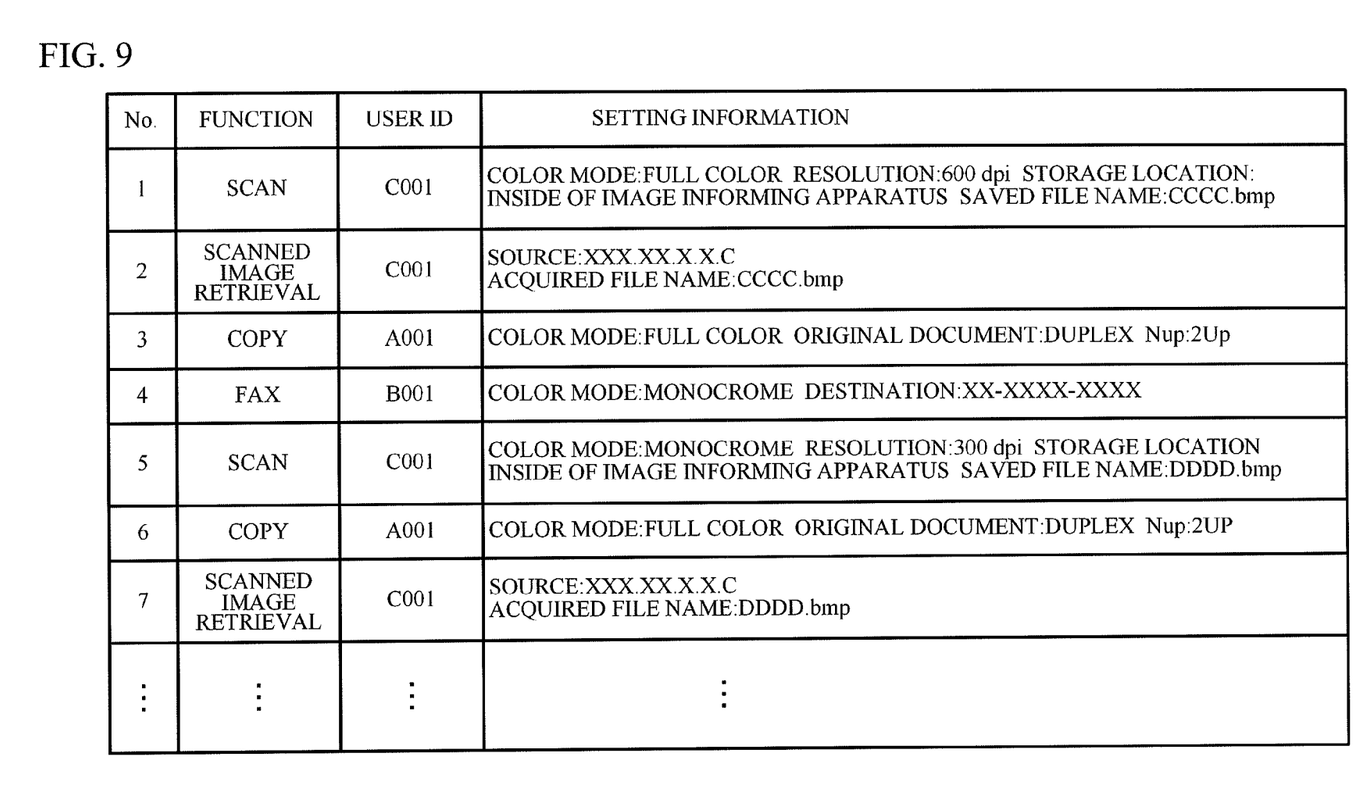
FIG. 9 is a diagram illustrating history information stored in the history storage unit.
Figure 10A:
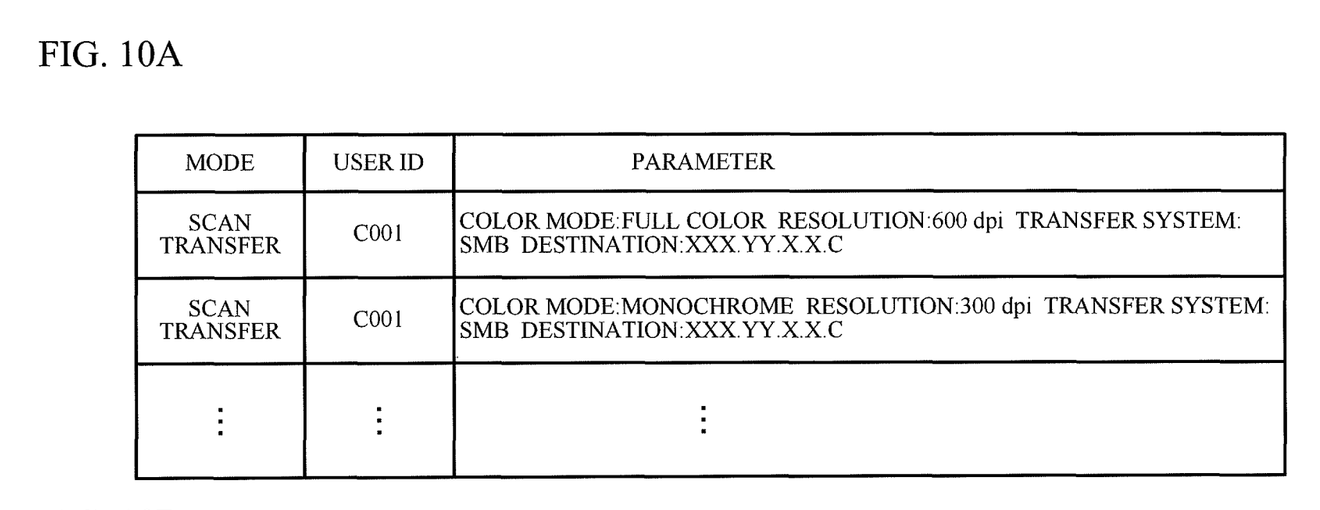
FIGS. 10A and 10B are diagrams for explaining a calculation of a usage frequency of each function executed by a function selection unit in accordance with a second exemplary embodiment.
Figure 10B:
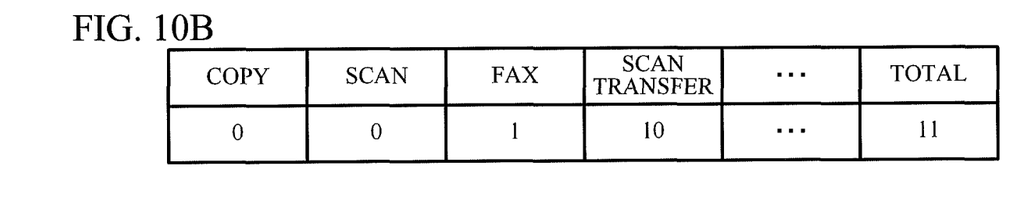

For example, assume that the controller 20 will create the optimized screen based on the history information illustrated in FIG. 9. Referring to the history information illustrated in FIG. 9, in the process No. 1, the user with a user ID of 'C001' used a scan function, and stores the image of an original document in the HDD 205 with the saved file name "CCCC.bmp". Then, in the process No. 2, the user with a user ID of 'C001' retrieves the image CCCC.bmp stored in the HDD 205 in the process No. 1 from the information processing apparatus represented by the IP address XXX.XX.X.X.C. These sequential processes No. 1 and No. 2 can be replaced with a 'scan-transfer' function provided by the image forming apparatus 100. Thus, the function selection unit 212 replaces functions 'scan' and 'scanned image retrieval', which are used in processes No. 1 and No. 2, with 'scan-transfer' when it counts the number of usage times of each function as illustrated in FIG. 10A. In addition, in FIG. 9, the image of the original document which is stored in the HDD 205 with the saved file name DDDD.bmp by using a scan function in the process No. 5 is retrieved from the information processing apparatus represented by the ID address XXX.XX.X.X.C in the process No. 7. Thus, the function selection unit 212 replaces functions 'scan' and 'scanned image retrieval' used in processes No. 5 and No. 7 with 'scan-transfer' when it counts the number of usage times of each function as illustrated in FIG. 10A. The setting information in the execution of scan and the setting information in the execution of scanned image retrieval are stored as the setting information. The function selection unit 212 counts the number of usage times of each function by using the function with which functions are replaced as illustrated in FIG. 10B.

In the above example, when the user with a user ID of 'C001' also executes the process using a scan-transfer function, the number of usage times of 'scan-transfer' is calculated by adding up the number of usage times of 'scan-transfer' and the number of usage times of 'scan' or 'scanned image retrieval'.

There is a case where the operation that the user usually carries out to achieve user's desiring process conclusively can be achieved by easier operation. According to the second exemplary embodiment, the function selection unit 212 replaces different functions used in several processes with one function and calculates the usage frequency when the several processes stored in the history storage unit 211 can be achieved by one function provided by the image forming apparatus 100. According to this, the operation screen to achieve user's desiring process efficiently is provided. For example, as described above, assume that the process that user desires conclusively is to retrieve the image scanned by the image forming apparatus 100 in the information processing apparatus of the user. Furthermore, assume that the user usually carries out two operations to retrieve the scanned image in the information processing apparatus of the user, the one being for executing a scan in the image forming apparatus 100 and the other being for acquiring the scanned image from the information processing apparatus. This two-step process executed by the user can be achieved by a 'scan-transfer' function of the image forming apparatus 100. In this case, according to the second exemplary embodiment, the operation screen for executing a scan-transfer is provided to the user, and the operation screen to achieve user's desiring process efficiently will be provided.

Figure 11:
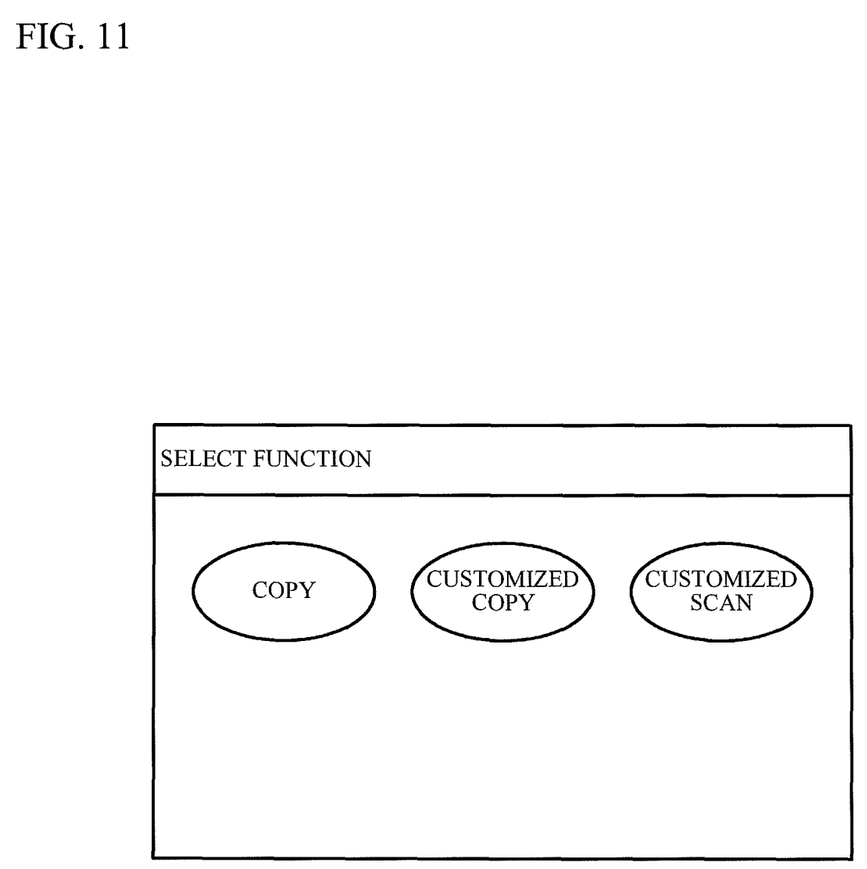
FIG. 11 is a diagram illustrating an optimized screen created by the display controller.

In above exemplary embodiments, a description was given of a case where the image forming apparatus 100 executes the user management, and creates the optimized screen with respect to each user. However, it is possible to adopt the present invention to the image forming apparatus that does not execute a user management. In this case, the history information does not include the item "user ID". Therefore, the function selection unit 212 determines the function to be displayed on the optimized screen based on the number of usage times of each function included in the history information. Moreover, in this case, a key to execute each function with normal operation (normal operation key) and a key to make it possible to execute a function determined by the function selection unit 212 by inputting only the setting items determined by the setting item determination unit 213 (simple operation key) may be displayed on the operation screen as illustrated in FIG. 11. For example, in FIG. 11, a key to execute a 'copy' function is displayed on the operation screen as the normal operation key. In addition, in FIG. 11, keys to execute a 'copy' function and a 'scan' function are displayed on the operation screen as a simple operation key. Here, it is desirable to add the word such as "customized" to the simple operation key to make it possible to distinguish the normal operation key from the simple operation key for example. The display color and icon of the simple operation key may be made different from those of the normal operation key. There may be users who want to input the setting information other than the setting items determined by the setting item determination unit 213 in users of the image forming apparatus. The operation screen of which the user-friendliness is high for both users who wants to execute detail settings and who wants to execute a process with a simple operation is provided by displaying the normal operation key and the simple operation key on the operation screen.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

The functions provided to the controller 20 in the above exemplary embodiments can be achieved by a computer provided with a CPU, a ROM, a RAM and the like. In that case, programs where the process of the function that the controller 20 has is written are provided. The process function described above can be implemented to the computer by executing programs by the computer. Programs where the content of the process is written can be stored in the computer readable medium.

Programs are distributed in a transportable recording medium such as DVDs (Digital Versatile Disc) and CD-ROMs (Compact Disc Read Only Memory) in which programs are recorded. Programs can be stored in a storage device of a server computer, and be transferred to other computers from the server computer via a network.

The computer executing programs stores programs recoded in the transportable recoding medium or programs transferred from the server computer to its storage device. Then, the computer reads a program from its storage device, and executes the process according to the program. The computer can read a program from the transportable recording medium directly and executes the process according to the program. The computer can executes a process according to a program that the computer receives every time when the program is transferred from the server computer.

What is claimed is:

1. A screen control device comprising:
   a storage unit that stores a content of a function used in a process executed in an information processing apparatus in association with setting information set to a setting item of the function;
   a function selection unit configured to calculate a usage frequency of each function stored in the storage unit, and select at least one function based on the usage frequency;
   a setting item determination unit configured to determine a setting item for receiving an input from a user from setting items relating to a function selected by the function selection unit, based on the setting information stored in the storage unit;
   a display controller configured to display a screen that enables to receive an instruction to execute the function selected by the function selection unit and a screen that receives an input to a setting item determined by the setting item determination unit from a user,
   wherein in a case where processes executed by using different functions stored in the storage unit and executed separately can be achieved by one function provided by the information processing apparatus, the function selection unit calculates a usage frequency of the one function by adding up a usage frequency of one of the different functions used in the processes and a usage frequency of the one function, and
   wherein in a case where processes executed by using different functions stored in the storage unit can be achieved by one function provided by the information processing apparatus, the function selection unit calculates a usage frequency after replacing different functions used in the processes with the one function.

2. The screen control device according to claim 1, wherein the storage unit stores user information representing a user who executed a process using the function in association with the content of the function and the setting information set in the process,
   the function selection unit selects at least one function with respect to each user based on a usage frequency of each function calculated with respect to each user, and
   the display controller displays a screen that enables to receive an instruction to execute the function selected by the function selection unit and a screen that receives an input to the setting item determined by the setting item determination unit from a user on a display according to a user who uses the information processing apparatus.

3. The screen control device according to claim 1, wherein the display controller displays a normal operation key to execute each function provided by the information processing apparatus and a simple operation key to execute the function selected by the function selection unit on a display, and
the simple operation key is displayed so as to be distinguished from the normal operation key.

4. A screen control device comprising:
a history storage unit that stores history information that records a function used in a process executed in an information processing apparatus in association with setting information set in the process;
a function selection unit configured to calculate a usage frequency of each process stored in the history storage unit based on the history information, and select at least one function based on the usage frequency;
a setting item determination unit configured to determine a setting item for receiving an input from a user based on setting information stored in the history information in association with the function selected by the function selection unit; and
a display controller configured to display a screen that enables to receive an instruction to execute the function selected by the function selection unit and a screen that receives an input to a setting item determined by the setting item determination unit from a user on a display,
wherein in a case where processes executed by using different functions stored in the storage unit can be achieved by one function provided by the information processing apparatus, the function selection unit calculates a usage frequency after replacing different functions used in the processes with the one function, and
wherein in a case where processes executed by using different functions stored in the storage unit and executed separately can be achieved by one function provided by the information processing apparatus, the function selection unit calculates a usage frequency of the one function by adding up a usage frequency of one of the different functions used in the processes and a usage frequency of the one function.

5. The screen control device according to claim 4, wherein the history storage unit stores user information representing a user who executed a process using the function in association with the content of the function and the setting information set in the process,
the function selection unit selects at least one function with respect to each user based on a usage frequency of each function calculated with respect to each user, and
the display controller displays a screen that enables to receive an instruction to execute the function selected by the function selection unit and a screen that receives an input to the setting item determined by the setting item determination unit from a user on the display according to a user who uses the information processing apparatus.

6. The screen control device according to claim 4, wherein the display controller displays a normal operation key to execute each function provided by the information processing apparatus and a simple operation key to execute the function selected by the function selection unit on a display, and
the simple operation key is displayed so as to be distinguished from the normal operation key.

7. An image forming apparatus comprising:
a display that displays an operation screen receiving an operational input from a user; and
a display control device, wherein
the display control device including:
a history storage unit that stores history information that records a function used in a process executed in an information processing apparatus in association with setting information set in the process;
a function selection unit configured to calculate a usage frequency of each process stored in the history storage unit based on the history information, and select at least one function based on the usage frequency;
a setting item determination unit configured to determine a setting item for receiving an input from a user based on setting information stored in the history information in association with the function selected by the function selection unit; and
a display controller configured to display a screen that enables to receive an instruction to execute the function selected by the function selection unit and a screen that receives an input to a setting item determined by the setting item determination unit from a user on a display,
wherein in a case where processes executed by using different functions stored in the history storage unit can be achieved by one function provided by the information processing apparatus, the function selection unit calculates a usage frequency after replacing different functions used in the processes with the one function, and
wherein in a case where processes executed by using different functions stored in the storage unit and executed separately can be achieved by one function provided by the information processing apparatus, the function selection unit calculates a usage frequency of the one function by adding up a usage frequency of one of the different functions used in the processes and a usage frequency of the one function.

8. A non-transitory computer readable medium storing a program causing a computer to execute a process, the process comprising:
storing history information that records a function used in a process executed in an information processing apparatus in association with setting information set in the process to a storage device;
calculating a usage frequency of each function based on the history information;
selecting at least one function based on the usage frequency;
determining a setting item for receiving an input from a user based on setting information set in processes using the function selected in the selecting; and
displaying a screen that enables to receive an instruction to execute the function selected in the selecting and a screen that receives an input to a setting item determined in the determining from a user on a display,
wherein in a case where processes executed by using different functions stored in the storage device can be achieved by one function, the calculating the usage frequency calculates the usage frequency after replacing different functions used in the processes with the one function, and
wherein in a case where processes executed by using different functions stored in the storage unit and executed separately can be achieved by one function, the calculating the usage frequency calculates a usage frequency of the one function by adding up a usage frequency of one of the different functions used in the processes and a usage frequency of the one function.

* * * * *